United States Patent [19]

Amano et al.

[11] 4,349,243

[45] Sep. 14, 1982

[54] OPTICAL FIBER SUBMARINE CABLE

[75] Inventors: Kitsutaro Amano, Yokohama; Taiichiro Nakai, Fujisawa; Masanori Sato, Machida; Makoto Nunokawa, Kawasaki, all of Japan

[73] Assignee: Kokusai Denshin Denwa Kabushiki Kaisha, Japan

[21] Appl. No.: 67,893

[22] Filed: Aug. 20, 1979

[30] Foreign Application Priority Data

Aug. 23, 1978 [JP] Japan .................. 53-101732

[51] Int. Cl.³ .................................................. G02B 5/16
[52] U.S. Cl. .................. 350/96.23; 174/70 R; 174/102 R
[58] Field of Search .......... 350/96.23; 174/70 R, 174/70 S, 101, 102 R, 102 C

[56] References Cited

U.S. PATENT DOCUMENTS

| | | | |
|---|---|---|---|
| 3,766,307 | 10/1973 | Andrews, Jr. ............... | 350/96.23 |
| 4,110,001 | 8/1978 | Olszewski et al. ........... | 350/96.23 |
| 4,146,302 | 3/1979 | Jachimowicz ............... | 350/96.23 |
| 4,156,104 | 5/1979 | Mondello .................... | 350/96.23 |
| 4,160,872 | 7/1979 | Lundberg et al. ............ | 350/96.23 |
| 4,239,336 | 12/1980 | Parfree et al. ............... | 350/96.23 |

FOREIGN PATENT DOCUMENTS

| | | | |
|---|---|---|---|
| 2507648 | 9/1976 | Fed. Rep. of Germany ... | 350/96.23 |
| 2507649 | 9/1976 | Fed. Rep. of Germany ... | 350/96.23 |
| 2820510 | 11/1978 | Fed. Rep. of Germany ... | 350/96.23 |
| 2265108 | 10/1975 | France ........................... | 350/96.23 |

OTHER PUBLICATIONS

G. Bahder et al., "Experience To-Date With Optical Fiber Cables", *Technical Paper General Cable Corp.*, Feb. 1978.

G. Wilkins, "Fiber Optic Cables for Undersea Communications", in *Fiber and Integrated Optics*, vol. 1, No. 1, Jan. 1977.

*Primary Examiner*—John D. Lee
*Assistant Examiner*—Frank Gonzalez
*Attorney, Agent, or Firm*—Robert E. Burns; Emmanuel J. Lobato; Bruce L. Adams

[57] ABSTRACT

An optical fiber submarine cable comprising at least one optical fiber. A pipe-like pressure resisting layer is produced by forming a tape-like pressure resisting material into a pipe-like configuration with the optical fiber inserted therein. The pressure resisting layer has butt ends in its cross section, and a waterproof insulator layer is disposed closely around the pipe-like pressure resisting layer for maintaining the pipe-like configuration of the pipe-like pressure resisting layer and for preventing seawater from entering into a gap between the butt ends.

6 Claims, 9 Drawing Figures

OPTICAL FIBER SUBMARINE CABLE

BACKGROUND OF THE INVENTION

This invention relates to a cable structure of a submarine cable using a low-loss optical fiber as a transmission medium.

The optical fiber has the advantages of low loss, wide bandwidth and light weight and hence is regarded as a promising transmission medium which will succeed a coaxial submarine cable heretofore employed. A submarine cable is held as deep under the sea as 8000 m and exposed to a high pressure of about 800 kg/cm$^2$ on the sea bottom. The optical fiber is made of low-loss silica glass or optical glass, and hence is brittle and easily broken under an external force, such as bending or tensile force; and when the optical fiber is immersed in seawater for a long time, a very small crack in the glass is likely to grow, resulting in breakage of the optical fiber. Therefore, the optical fiber is usually coated with nylon or like material so as to enhance its mechanical properties and prevent their degradation. In a case of this coated optical fiber, however, when it is given hydraulic pressure or the like, the optical fiber is slightly bent due to nonhomogeneity of the coating material, causing a marked increase in transmission loss.

In view of the above, it has already been proposed to house the optical fiber in a high pressure resisting pipe of a small diameter (refer to Japanese Pat. Disc. No. 99032/76). As the small-diametered, high pressure resisting pipe for housing the optical fiber, what is called a seamless pipe or welded pipe is considered; but, in a case of the seamless pipe, it is difficult to fabricate a long pipe while inserting thereinto the optical fiber, and it is also difficult to insert the optical fiber into the long pipe after it is produced. In a case of welded pipe, the temperature of a welding point raises, so that the optical fiber housed in the pipe may be sometimes damaged; therefore, some measure must be taken to protect the optical fiber from heating.

SUMMARY OF THE INVENTION

An object of the present invention is to provide an optical fiber submarine cable which obviates such defects of the prior art and which can continuously be manufactured in great lengths while inserting therein an optical fiber by using the existing pipe forming techniques employing a roll former or the like.

In accordance with the present invention, there is provided an optical fiber submarine cable comprising at least one optical fiber, a pipe-like pressure resisting layer produced by forming a tape-like pressure resisting material into a pipe-like configuration with the optical fiber inserted therein, the pressure resisting layer having butt ends in its cross section, and a waterproof insulator layer disposed closely around the pipe-like pressure resisting layer for maintaining the pipe-like configuration of the pipe-like pressure resisting layer and preventing seawater from entering into a gap between the butt ends.

BRIEF DESCRIPTION OF THE DRAWINGS

This invention will hereinafter be described in detail with reference to the accompanying drawings, in which.

DESCRIPTION OF THE PREFERRED EMBODIMENTS

Figure 1:
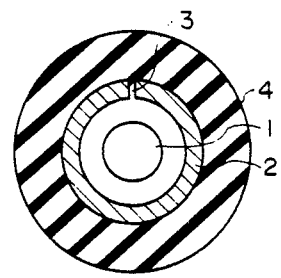
FIG. 1 is a cross-sectional view explanatory of an embodiment of this invention.

With reference to FIG. 1 showing a cross-sectional view of a cable, which is provided with a pressure resisting layer having housed therein an optical fiber, reference numeral 1 indicates an optical fiber; 2 designates a pressure resisting layer produced by forming a tape-like pressure resisting layer material into a pipe-like configuration as by a multistage roll former; 3 identifies a butt portion of the pressure resisting layer 2; and 4 denotes a waterproof insulator, such as polyethylene. Hydraulic pressure to the submarine cable is a hydrostatic pressure which is applied thereto uniformly over the entire area of its peripheral surface, and even if a very small gap exists in the butt portion 3 of the pressure resisting layer 2, the butt ends of the pressure resisting layer 2 will naturally be urged against each other by the hydraulic pressure to the cable, resulting in the pressure resisting layer 2 becoming substantially completely cylindrical. Accordingly, by taking a measure to prevent seawater from entering through the butt portion 3, it is ensured that the pipe-like pressure resisting layer 2 has pressure resistance to substantially the same degree as the welded pipe. The insulator 4 prevents seawater from entering into the pressure resisting layer 2 through the butt portion 3 and prevents the butt portion 3 from opening outwardly or the butt ends of the pressure resisting layer from misalignment with each other in the radial direction of the cable, thus performing the function of retaining the pressure resisting layer 2 cylindrical. Further, the pressure resisting layer 2 can be used as an electric power feeder if it is formed of a good conductor of electricity. After the pipe-like pressure resisting layer 2 is formed into the pipe-like configuration, the butt portion 3 is not welded; consequently, the insulator 4 which is extruded after forming the pressure resisting layer 2 into the pipe-like configuration may in some cases enter into the butt portion 3, or when the butt portion 3 is large to some extent, the insulator 4 sometimes experiences cold flow due to a high hydraulic pressure after laying of the cable on the seabed, entering into the gap of the butt portion 3 of the pressure resisting layer 2.

Figure 2A:
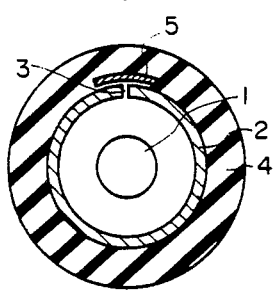
FIGS. 2A, 2B and 2C are cross-sectional views explanatory of other embodiments of this invention.
Figure 2B:
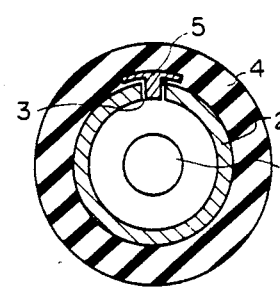
Figure 2C:
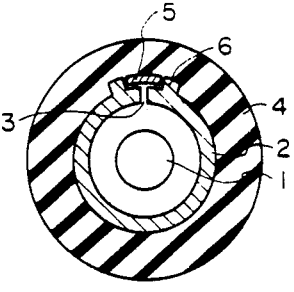

FIGS. 2A, 2B and 2C illustrate arrangements in which the outside of the butt portion 3 of the pressure resisting layer 2 is covered with a structure 5 of a material which is not liable to experience cold flow, thereby to ensure that the insulator 4 does not enter into the butt portion 3. FIG. 2A shows an arrangement in which a tape-like structure 5 for preventing the insulator 4 from entering into the butt portion 3 of the pressure resisting layer 2 is disposed on the outside of the butt portion 3 in its lengthwise direction. FIGS. 2B and 2C show arrangements of the structure 5 for preventing the insulator 4 from entering into the butt portion 3 of the pressure resisting layer 2 if it is displaced by bending or twisting of the cable. In FIG. 2B, the structure 5 is formed to be T-shaped in cross section. In FIG. 2C, reference numeral 6 indicates guides provided on the pressure resisting layer 2 for keeping the structure 5 in position.

Figure 3A:
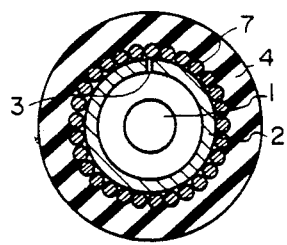
FIGS. 3A, 3B and 3C are cross-sectional views explanatory of other embodiments of this invention.
Figure 3B:
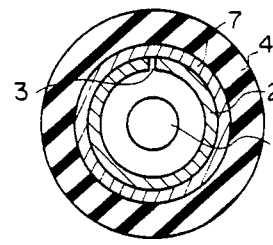
Figure 3C:
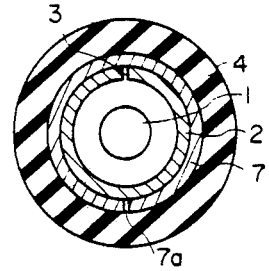

FIGS. 3A, 3B and 3C illustrate other embodiments of this invention in which a structure 7 made of a material, such as a metal or the like, is closely disposed on the outside of the pressure resisting layer 2 to maintain the pipe-like configuration of the pressure resisting layer 2 and prevent the insulator 4 from entering into the butt portion 3 of the pressure resisting layer 2. FIG. 3A shows an arrangement in which the structure 7 is formed with tension-proof wires; FIG. 3B shows an arrangement in which the structure 7 is at least one tape-like member spirally wound around the pressure resisting layer 2 in its axial direction; and FIG. 3C shows an arrangement in which the structure 7 is formed to have a pipe-like configuration similar to the pressure resisting layer 2 and having a butt portion 7a diametrically opposite to that 3 of the pressure resisting layer across the optical fiber 1. In FIGS. 3A, 3B and 3C, the structure 7 may also be made of an electric power feeder of a good conductor of electricity, such as copper.

Figure 4A:
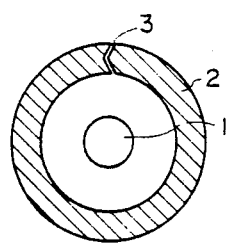
FIGS. 4A and 4B are cross-sectional views explanatory of still other embodiments of this invention.
Figure 4B:
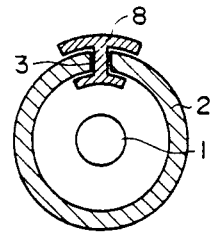

FIG. 4A illustrates a construction of the pressure resisting layer 2 in which its butt ends are formed to have a recess and a projection in cross section for engagement with each other so that they are not displaced relative to each other in the radial direction of the cable, thereby to further ensure holding of the pipe-like configuration of the pressure resisting layer 2. FIG. 4B shows another construction of the pressure resisting layer 2 for preventing displacement of the butt ends of the pressure resisting layer relative to each other in the radial direction of the cable, wherein an I-shaped structure 8 is inserted into the butt portion 3 of the pressure resisting layer 2.

As has been described in the foregoing, according to the present invention, by using a pressure resisting layer which is obtained by forming a tape-like pressure resisting layer material into a pipe-like configuration by means of a roll former or the like, with butt ends of the pipe-like layer left unwelded, it is possible to easily manufacture a long pressure resisting layer successively while inserting thereinto an optical fiber, by employing the conventional manufacturing techniques, without degrading the optical fiber due to heat of welding. Moreover, for holding the pipe-like configuration of the pressure resisting layer, it is possible to utilize the insulator, the electric power feeder and the tension-proof wires which are indispensable components for the optical fiber submarine cable; therefore, an optical fiber submarine cable is obtainable which is not complicated in cable structure, withstands a high hydraulic pressure and is easy to manufacture. On top of that, by employing the pressure resisting layer structure which prevents relative displacement of butt ends of the pressure resisting layer in the radial direction of the cable, a more reliable optical fiber submarine cable is available.

What we claim is:

1. An optical fiber submarine cable comprising: at least one optical fiber; a pipe-like external pressure resisting layer produced by forming a tape-like pressure resisting material into a pipe-like configuration with the optical fiber inserted therein, the external pressure resisting layer having unconnected butt ends in its cross section; a waterproof insulator layer disposed closely around the pipe-like external pressure resisting layer for maintaining the pipe-like configuration of the pipe-like external pressure resisting layer and preventing seawater from entering into a gap between the butt ends; and a tape-like structure disposed on the pipe-like external pressure resisting layer comprised of the tape-like pressure resisting material and extending along and covering the butt ends of the pipe-like external pressure resisting layer for preventing any portion of the waterproof insulator layer from entering between the butt ends under the influence of external pressure applied to the submarine cable, wherein a respective one of the tape-like structure and the pipe-like external pressure resisting layer comprised of the tape-like pressure resisting material is formed to have a cross section which prevents the tape-like structure from being displaced on the surface of the pipe-like external pressure resisting layer.

2. An optical fiber submarine cable according to claim 1, wherein the pipe-like resisting layer is formed of a single tape-like pressure resisting material layer.

3. An optical fiber submarine cable according to claim 2, wherein the butt ends of the single tape-like pressure resisting material layer in cross section have a recess and a projection respectively for engagement with each other so as not to be displaced in the radial direction of the cable.

4. An optical fiber submarine cable according to claim 1, wherein the pipe-like pressure resisting layer is composed of a single tape-like pressure resisting material layer having the butt ends and a tension-proof wire layer disposed closely around the tape-like pressure resisting material layer.

5. An optical fiber submarine cable according to claim 1, the pipe-like pressure resisting layer is composed of a single tape-like pressure resisting material layer having the butt ends and a pressure resisting tape material layer disposed closely around the tape-like pressure resisting material layer.

6. An optical fiber submarine cable comprising: an optical fiber; a tubular external pressure resisting layer disposed around said optical fiber, said tubular external pressure resisting layer having a seam extending along the length of said optical fiber and defined by a pair of unconnected confronting edges of said tubular external pressure resisting layer, and said pair of confronting edges of said tubular external pressure resisting layer abutting under external pressure applied to the optical fiber submarine cable; an outer waterproof layer covering and contacting said tubular external pressure resisting layer for holding said pair of confronting edges in their confronting positions and for preventing fluid from entering the optical fiber submarine cable through the seam of said tubular external pressure resisting layer; and a tape-like element disposed on said tubular external pressure resisting layer and extending along and covering the seam of the external pressure resisting layer, wherein a respective one of said tape-like element and said tubular external pressure resisting layer having a cross section effective for preventing said tape-like element from being displaced on the surface of said tubular external pressure resisting layer.

\* \* \* \* \*